United States Patent
Fujita

(10) Patent No.: US 9,394,873 B2
(45) Date of Patent: Jul. 19, 2016

(54) VEHICLE STARTING APPARATUS

(75) Inventor: Masahiko Fujita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 296 days.

(21) Appl. No.: 14/115,411

(22) PCT Filed: Sep. 7, 2011

(86) PCT No.: PCT/JP2011/070343
§ 371 (c)(1),
(2), (4) Date: Nov. 4, 2013

(87) PCT Pub. No.: WO2013/035168
PCT Pub. Date: Mar. 14, 2013

(65) Prior Publication Data
US 2014/0076259 A1    Mar. 20, 2014

(51) Int. Cl.
*F02N 15/00*    (2006.01)
*F02N 11/10*    (2006.01)
(Continued)

(52) U.S. Cl.
CPC .............. *F02N 15/00* (2013.01); *F02N 11/087* (2013.01); *F02N 11/10* (2013.01); *F02D 2250/28* (2013.01); *F02N 11/04* (2013.01); *F02N 11/0848* (2013.01); *F02N 15/08* (2013.01); *F02N 2011/0885* (2013.01);
(Continued)

(58) Field of Classification Search
CPC ... F02N 15/00; F02N 11/08; F02N 2300/102; F02N 11/0814; F02N 11/0829; F02N 11/10; F02D 2250/28; F02D 41/06
USPC ........ 123/185.1, 179.1, 179.3, 179.4, 179.28; 701/113
See application file for complete search history.

(56) References Cited

U.S. PATENT DOCUMENTS 5,015,941 A      5/1991   Dhyanchand
5,992,593 A  *  11/1999   Yamamoto .............. F16D 13/70
                                                                192/48.1

(Continued)

FOREIGN PATENT DOCUMENTS

CN       1519469 A      8/2004
CN       1696495 A     11/2005
(Continued)

OTHER PUBLICATIONS

Communication dated Jul. 2, 2015 from the State Intellectual Property Office of the People's Republic of China in counterpart application No. 201180071538.6.

(Continued)

*Primary Examiner* — Stephen K Cronin
*Assistant Examiner* — Xiao Mo
(74) *Attorney, Agent, or Firm* — Sughrue Mion, PLLC

(57) ABSTRACT

There is provided a vehicle starting apparatus that reduces vibration of an engine caused when the engine starts so that vibration of the vehicle can be decreased. A vehicle starting apparatus according to the present invention is provided with an engine starting apparatus that starts an engine mounted in a vehicle, wherein before the engine is ignited, the engine starting apparatus makes a cranking rotation speed of the engine lower than a rotation speed corresponding to the resonance frequency of the engine, and after the engine has been ignited, the engine starting apparatus increases the rotation speed of the engine up to a rotation speed that is the same as or higher than said rotation speed corresponding to the resonance frequency.

6 Claims, 3 Drawing Sheets

(51) Int. Cl.
  *F02N 11/04* (2006.01)
  *F02N 11/08* (2006.01)
  *F02N 15/08* (2006.01)

(52) U.S. Cl.
  CPC .. *F02N 2011/0896* (2013.01); *F02N 2200/041* (2013.01); *F02N 2200/042* (2013.01); *F02N 2200/044* (2013.01); *F02N 2300/102* (2013.01)

(56) References Cited

U.S. PATENT DOCUMENTS

| | | | |
|---|---|---|---|
| 2005/0022770 A1 | 2/2005 | Yumiyama et al. | |
| 2005/0252474 A1 | 11/2005 | Sah et al. | |
| 2006/0016412 A1 | 1/2006 | Butcher et al. | |
| 2008/0045382 A1* | 2/2008 | Kawasaki | B60K 6/365 477/115 |
| 2008/0047524 A1* | 2/2008 | Tamai | B60W 10/06 123/333 |
| 2009/0256513 A1* | 10/2009 | Ando | B60K 6/445 318/478 |

FOREIGN PATENT DOCUMENTS

| | | |
|---|---|---|
| JP | 2002-155774 A | 5/2002 |
| JP | 2003-113763 A | 4/2003 |
| JP | 2004-340010 A | 12/2004 |
| JP | 2005-16442 A | 1/2005 |
| JP | 2008-25375 A | 2/2008 |
| JP | 2010-81741 A | 4/2010 |
| JP | 201151480 A | 3/2011 |

OTHER PUBLICATIONS

Communication dated Aug. 5, 2014, issued by the Japanese Patent Office in counterpart Application No. 2013532354.
Machine Translation of JP2002155774 of record.
Machine Translation of JP2004340010 of record.
Machine Translation of JP2010081741 of record.
Communication dated Dec. 16, 2015 from the European Patent Office issued in counterpart European application No. 11871919.4.

* cited by examiner

VEHICLE STARTING APPARATUS

CROSS REFERENCE TO RELATED APPLICATIONS

This application is a National Stage of International Application No. PCT/JP2011/070343, filed on Sep. 7, 2011, the contents of all of which are incorporated herein by reference in their entirety.

TECHNICAL FIELD

The present invention relates to a vehicle starting apparatus that starts an engine mounted in a vehicle.

BACKGROUND ART

In recent years, in order to raise gasoline mileage and conformity to the environment standard, there has been developed a vehicle starting apparatus that is equipped with a power-generation motor and performs a so-called idling stop in which the engine is stopped when the vehicle stops and the engine is restarted by use of the power-generation motor when the vehicle starts. Because the vehicle power-generation motor utilized in such control as described above needs to be small-size, low-cost, and high-torque; therefore, in many cases, a coil-magnetic-field power-generation motor is utilized therefor.

In an idling stop system utilizing such a coil-magnetic-field power-generation motor, in order to start the engine as early as possible when the engine starts, ignition may be implemented, as disclosed in Patent Document 1, by applying maximal torque control to the starting apparatus so as to crank the engine.

PRIOR ART REFERENCE

Patent Document

[Patent Document 1] Japanese Patent Application Laid-Open No. 2003-113763

DISCLOSURE OF THE INVENTION

Problems to be Solved by the Invention

However, in a conventional apparatus disclosed in Patent Document 1, because when the engine is being cranked, the cranking rotation speed falls within the resonance frequency range, vibration of the engine is enlarged and hence vibration of the vehicle is increased; thus, discomfort may be given to the driver or the fellow passengers.

The present invention has been implemented in order to solve the foregoing problem in a control apparatus for a vehicle starting apparatus; the objective thereof is to provide a vehicle starting apparatus that reduces vibration of an engine caused when the engine starts so that vibration of the vehicle can be decreased.

Means for Solving the Problems

A vehicle starting apparatus according to the present invention is provided with an engine starting apparatus that starts an engine mounted in a vehicle, wherein before the engine is ignited, the engine starting apparatus makes a cranking rotation speed of the engine lower than a rotation speed corresponding to the resonance frequency of the engine, and after the engine has been ignited, the engine starting apparatus increases the rotation speed of the engine up to a rotation speed that is the same as or higher than said rotation speed corresponding to the resonance frequency.

Advantage of the Invention

A vehicle starting apparatus according to the present invention can reduce vibration of an engine caused when the engine starts so that vibration of the vehicle can be decreased.

BEST MODE FOR CARRYING OUT THE INVENTION

Embodiment 1

Figure 1:
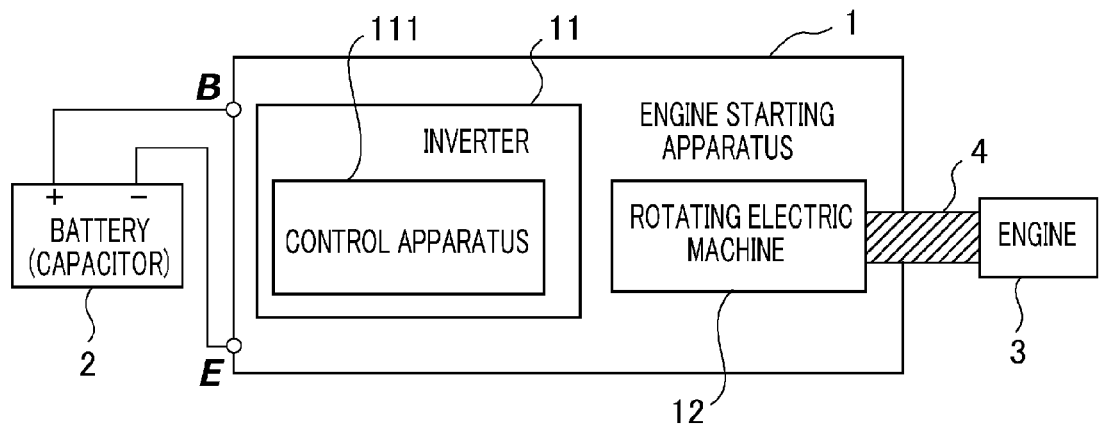
FIG. 1 is an explanatory diagram for a vehicle system equipped with a vehicle starting apparatus according to Embodiment 1 of the present invention.

Hereinafter, a vehicle starting apparatus according to Embodiment 1 of the present invention will be explained with reference to the drawings. FIG. 1 is an explanatory diagram for a vehicle system equipped with a vehicle starting apparatus according to Embodiment 1 of the present invention. In FIG. 1, an engine starting apparatus 1 is configured with an inverter 11 and a rotating electric machine 12. The engine starting apparatus 1 is provided with a control apparatus 111 that controls the inverter 11.

The rotating electric machine 12 is coupled with an engine 3 through the intermediary of a driving power transfer unit 4 such as a belt. When the engine 3 is started, the engine starting apparatus 1 is supplied with electric power by a power source apparatus 2, which is a battery or a capacitor, and makes the rotating electric machine 12 operate as a motor so that the engine 3 is rotated by the intermediary of the driving power transfer unit 4. A command of operation mode is instructed through a controller, a key switch, or the like of an external idling stop system, which is unillustrated in FIG. 1; the engine starting apparatus 1 is operated in a drive mode according to the command.

Figure 2:
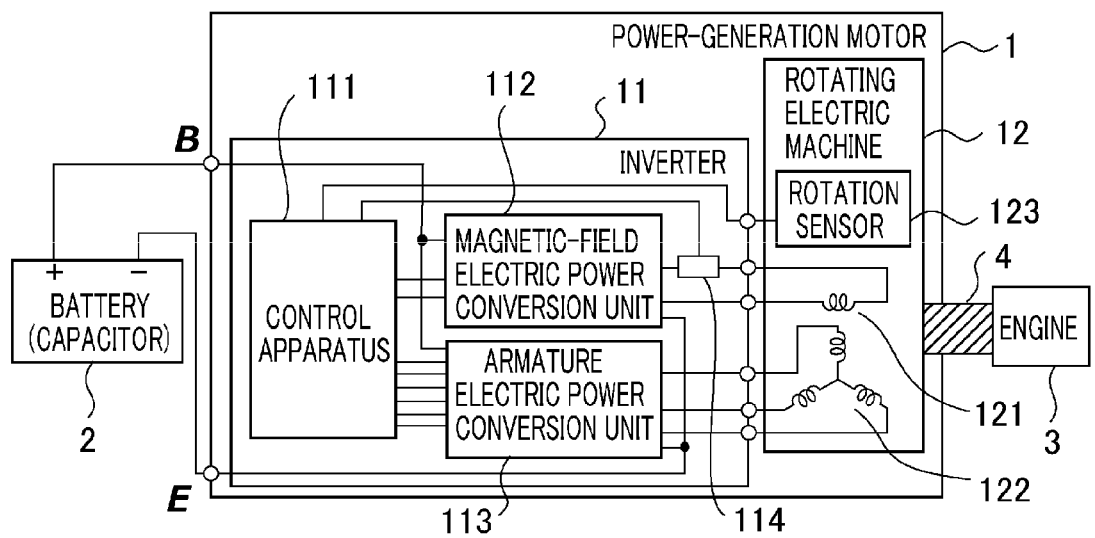
FIG. 2 is an explanatory diagram representing the details of a vehicle starting apparatus according to Embodiment 1 of the present invention.

FIG. 2 is an explanatory diagram representing the details of a vehicle starting apparatus according to Embodiment 1 of the present invention. In FIG. 2, described above, the engine starting apparatus 1 is configured with the inverter 11 and the rotating electric machine 12 and operates as a power-generation motor, as described later. The rotating electric machine 12 is formed of a coil-magnetic-field power-generation motor and is provided with an armature winding 122 provided in the stator thereof and a magnetic-field winding 121 provided in the rotor thereof. A rotation sensor 123 that detects the rotation speed of the rotor is provided in the power-generation motor 12.

The inverter 11 includes a magnetic-field electric power conversion unit 112 provided with an electric-power conversion device that controls the electric power of the magnetic-field winding 121, an armature electric power conversion unit 113 provided with an electric-power conversion device that controls the electric power of the armature winding 122, the control apparatus 111 that issues on/off commands for the respective electric-power conversion devices of the magnetic-field electric power conversion unit 112 and the armature electric power conversion unit 113, and a current sensor 114 for detecting a magnetic-field current.

The magnetic-field electric power conversion unit 112 operates in response to the on/off command for the electric-power conversion device from the control apparatus 111 and controls, through PWM control, the magnetic-field current that flows in the magnetic-field winding 121. In general, the magnetic-field electric power conversion unit 112 is formed of a half bridge circuit configured with MOS-type field-effect transistors (MOSFETs), which function as electric-power conversion devices.

In general, the armature electric power conversion unit 113 is formed of three-phase bridge circuit configured with MOSFETs, which function as electric-power conversion devices. When the engine starts, the armature electric power conversion unit 113 operates, as an inverter, in response to the on/off command for the electric-power conversion device from the control apparatus 111, converts DC power of the power source apparatus 2 into three-phase AC power so as to make an armature current flow in the armature coil 122 of the rotating electric machine 12, so that the rotating electric machine 12 operates as a motor. In some cases, the engine starting apparatus 1 makes the rotating electric machine 12 operate as an electric power generator. In this case, in response to the on/off command for the electric-power conversion device from the control apparatus 111, the armature electric power conversion unit 113 operates as a converter so as to convert three-phase AC power generated across the armature winding 122 into DC power and to supply the DC power to the power source apparatus 2 and other electric loads.

Figure 3:
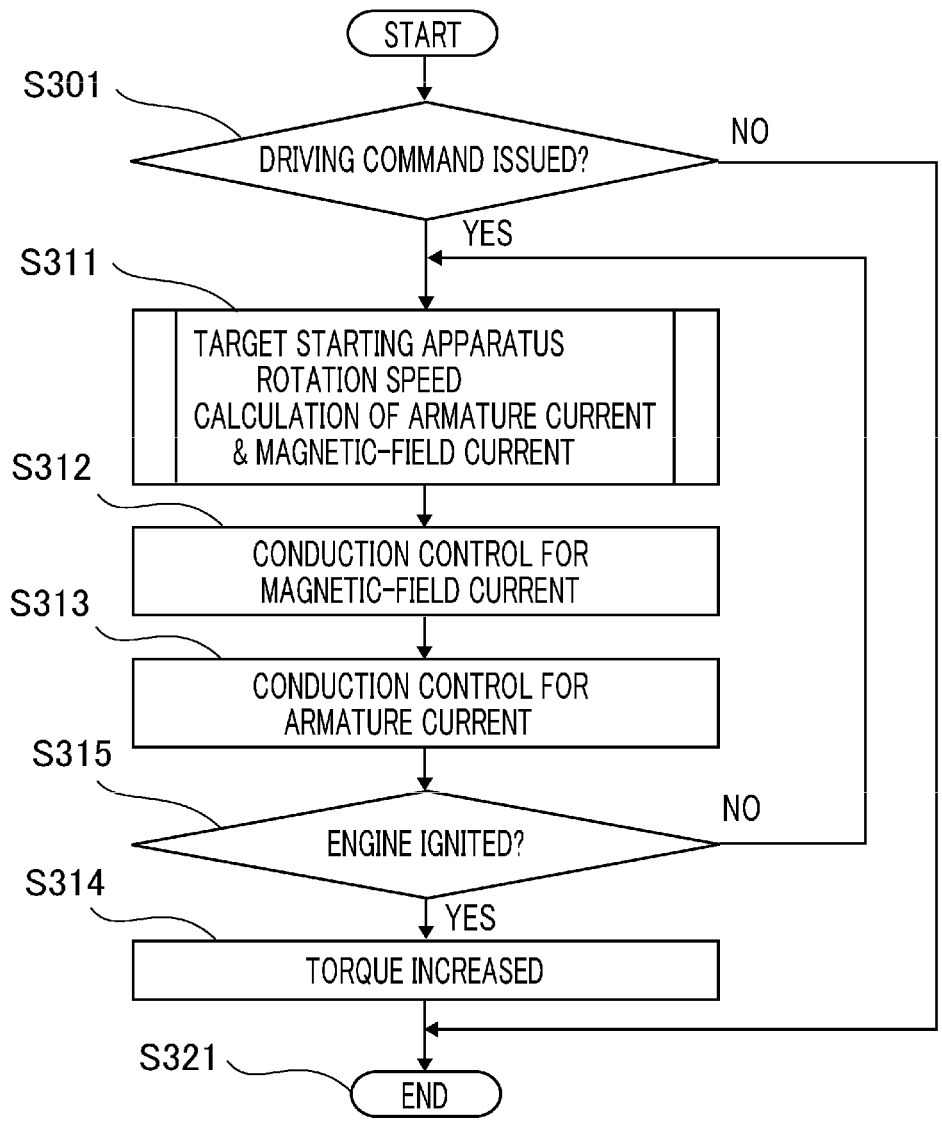
FIG. 3 is a flowchart for explaining the operation of a vehicle starting apparatus according to Embodiment 1 of the present invention.

Next, there will be explained the operation of the vehicle starting apparatus, according to the present invention, that is configured as described above. FIG. 3 is a flowchart for explaining the operation of a vehicle starting apparatus according to Embodiment 1 of the present invention. In FIG. 3, at first, in the step S301, it is determined whether or not a driving command has been issued from the controller, the key switch, or the like of the idling stop system. In the case where the driving command has been issued (YES), the step S301 is followed by the step S311. In the case where the driving command has not been issued (NO), no driving processing is implemented; thus, the processing is ended.

Because in FIG. 3, only the process related to the present invention is represented, the explanations for other processes are omitted; however, in the case where even when a driving command has issued, the engine starting apparatus is abnormal or the power-source voltage is out of a specified range, no driving is performed.

In the step S311, in accordance with the power-source voltage, the control apparatus 111 calculates the magnetic-field current and the armature current for a target starting apparatus rotation speed or the conduction phase angle for that armature current. The target starting apparatus rotation speed here signifies a target rotation speed of the rotating electric machine 12 at a time when the rotating electric machine 12 of the engine starting apparatus 1 cranks the engine 3 before ignition is implemented. In this situation, it is assumed that the target starting apparatus rotation speed calculated by the control apparatus 111 is smaller than the rotation speed thereof at a time when vibration whose frequency coincides with the resonance frequency of the engine 3 occurs in the engine 3.

As is well known, in the case where when being cranked before ignition is implemented, the engine 3 rotates at a specified rotation speed, the frequency of the vibration of the engine 3 caused by the rotation coincide with the inherent resonance frequency of the engine 3 and hence the engine 3 largely vibrates. The engine rotation speed that causes the engine 3 to vibrate at the resonance frequency is inherent to the engine, depending on the specification of the engine 3 or the structure of the vehicle in which the engine 3 is mounted, and can preliminarily be known through a calculation or an experiment.

Accordingly, in the step S311, in order to prevent the engine 3 from vibrating at the resonance frequency, the control apparatus 111 sets the target starting apparatus rotation speed of the rotating electric machine 12, which cranks the engine 3, at a rotation speed that is lower than the foregoing specific rotation speed so that the engine 3 rotates at a rotation speed that is lower than the specific rotation speed of the preliminarily obtained specific rotation speed of the engine 3; then, in accordance with the power-source voltage, the control apparatus 111 calculates the values of the magnetic-field current and the armature current for the target starting apparatus rotation speed. In this situation, it goes without saying that it may be allowed that instead of calculating the values of the magnetic-field current and the armature current, the respective conduction phase angles of the electric-power conversion devices for obtaining those current values are calculated.

Subsequently, in the step S312, based on the foregoing calculation results, the control apparatus 111 issues to the magnetic-field electric power conversion unit 112 the on/off commands for the electric-power conversion devices thereof; then, based on the commands, the magnetic-field electric power conversion unit 112 performs energization control of the magnetic-field current to the magnetic-field winding 121. As the controlling method for the magnetic-field current energization, there may be performed PI control or there may be performed control in which in order to raise the responsiveness of the magnetic-field current, the conduction rate of PWM control is set to 100[%] until the magnetic-field current reaches the target magnetic-field current.

Subsequently, in the step S313, based on the foregoing calculation results, the control apparatus 111 issues to the armature electric power conversion unit 113 the on/off commands for the electric-power conversion devices thereof; then, based on the commands, the armature electric power conversion unit 113 performs control the energization of the armature winding 122. In this situation, the armature current is controlled based on the conduction phase angle.

Through the magnetic-field current control in the step S312 and the armature current control in the step S313, the rotating electric machine 12 rotates at a speed that is lower than the foregoing specific rotation speed, and cranks the engine 3; in the step S315, it is determined whether or not the engine 3 has been ignited due to the cranking. Whether or not the engine 3 has been ignited may be determined based on the engine rotation speed or a change in the rotation speed or may be determined by electrically detecting that an ignition signal has been generated. In the case where it is determined in the step S315 that the engine 3 has been ignited (YES), the step S315 is followed by the step S314, where the engine 3 comes into the normal driving mode and the torque increases, so that the starting of the vehicle is completed.

The maximum value of the rotation speed at which the engine starting apparatus 1 can crank the engine 3 is set to be higher than a rotation speed corresponding to the foregoing resonance frequency of the engine 3. As described above, because the engine rotation speed at which the engine starting apparatus 1 can crank the engine 3 by itself is higher than a rotation speed corresponding to the resonance frequency of the engine, it is made possible that the increase in the torque after the ignition of the engine can largely accelerate the engine rotation speed and hence it is made possible to make the engine vibration frequency pass through the engine resonance frequency range in a short time; therefore, the vibration of the engine due to the resonance can be reduced and hence the vibration of the vehicle can be suppressed.

The torque exerted on the engine 3 by the engine starting apparatus 1 after the ignition of the engine is the maximum torque of the engine starting apparatus 1, i.e., the rotating electric machine 12. As described above, because the torque, accelerated after the ignition of the engine, becomes maximum, the acceleration of the engine rotation speed due to the increase in the torque after the ignition of the engine can further be enlarged. Accordingly, the engine vibration frequency can pass through the engine resonance frequency in a shorter time; therefore, the vibration of the engine due to the resonance can be reduced and hence the vibration of the vehicle can be suppressed.

In the case where it is determined in the step S315 that the engine 3 has not been ignited (NO), the step S315 is followed by the step S311; then, the processes from the step S311 to the step S315 are repeated until the ignition of the engine 3 is recognized.

As described above, the vehicle starting apparatus according to Embodiment 1 of the present invention suppresses the engine from vibrating when the engine is restarted; therefore, optimum restarting control in accordance with the power-source voltage can be implemented.

Embodiment 2

Figure 4:
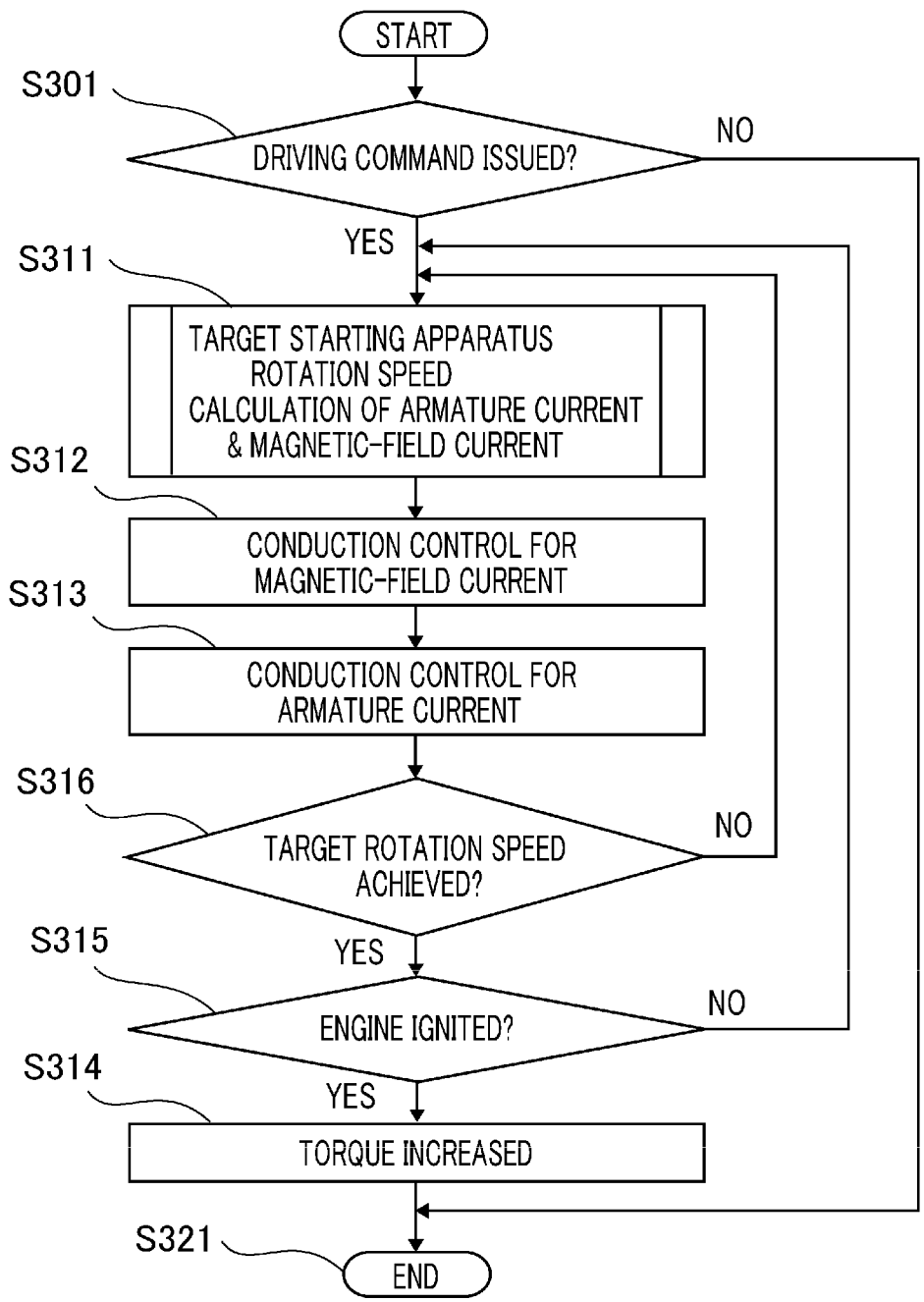
FIG. 4 is a flowchart for explaining the operation of a vehicle starting apparatus according to Embodiment 2 of the present invention.

In Embodiment 2, rotation speed feedback control is also implemented, in comparison to Embodiment 1. The other configurations are the same as those in Embodiment 1. FIG. 4 is a flowchart for explaining the operation of a vehicle starting apparatus according to Embodiment 2 of the present invention. Hereinafter, different points between Embodiments 1 and 2 will mainly be explained.

In FIG. 4, in the step S316, the rotation speed of the rotating electric machine 12 detected by the rotation sensor 123 and the target rotation speed are compared with each other, and rotation speed feedback control is implemented so that the difference between the rotation speed of the rotating electric machine 12 and the target rotation speed is under a given threshold value; in the case where the rotation speed of the rotating electric machine 12 has reached the target rotation speed (YES), the step S316 is followed by the step S315. The target rotation speed here signifies the target starting apparatus rotation speed in the step S311 explained in Embodiment 1.

In the case where it is determined in the step S316 that the rotation speed of the rotating electric machine 12 has not reached the target rotation speed (NO), the step S316 is followed by the step S311; then, the processes from the step S311 to the step S316 are repeated so that the rotation speed of the rotating electric machine 12 reaches the target rotation speed.

As described above, the vehicle starting apparatus according to Embodiment 2 of the present invention makes it possible to perform optimum rotation speed control in accordance with the power-source voltage. Moreover, feedback control raises the accuracy of the rotation speed and makes it possible to reduce vibration.

INDUSTRIAL APPLICABILITY

A vehicle starting apparatus according to the present invention can be applied to the field of the automobile industry, especially, to the field of an engine control apparatus.

DESCRIPTION OF REFERENCE NUMERALS

1: engine starting apparatus
2: battery
3: engine
4: driving power transfer unit
11: inverter
12: electric rotating machine
111: control apparatus
112: magnetic-field electric power conversion unit
113: armature electric power conversion unit
114: magnetic-field current sensor
121: magnetic-field coil
122: armature coil
123: rotation sensor

The invention claimed is:

1. A vehicle starting apparatus comprising:
an engine starting apparatus that starts an engine mounted in a vehicle, wherein the engine starting apparatus includes:
a rotating electric machine;
an inverter; and
a control apparatus that controls the rotating electric machine, the control apparatus configured to:
calculate a target rotation speed of the rotating electric machine which cranks the engine at a rotation speed that is lower than a rotation speed corresponding to a predetermined resonance frequency of the engine,
control the rotating electric machine to crank the engine at the target rotation speed before the engine is ignited and until the control apparatus determines the engine has been ignited due to the cranking at the target rotation speed, and
after the engine has been ignited, control the rotating electric machine to increase the rotation speed of the engine to be more than said rotation speed corresponding to the predetermined resonance frequency of the engine.

2. The vehicle starting apparatus according to claim 1, wherein a maximum value of the rotation speed at which the cranking can be implemented is larger than the value of said rotation speed corresponding to the resonance frequency of the engine.

3. The vehicle starting apparatus according to claim 1, wherein torque exerted on the engine by the engine starting apparatus after the ignition of the engine is the maximum torque thereof.

4. The vehicle starting apparatus according to claim 1, wherein the engine starting apparatus has a rotation detection unit that detects a rotation speed of the engine and performs rotation speed control in a feedback manner, based on detection of the rotation speed by the rotation detection unit.

5. The vehicle starting apparatus according to claim 1, wherein the engine starting apparatus starts the engine by the intermediary of a belt.

6. The vehicle starting apparatus according to claim 1, wherein the rotating electric machine includes a magnetic-field winding and an armature winding, and the inverter includes a magnetic-field electric power conversion unit that controls a magnetic-field current in the magnetic-field winding, an armature electric power conversion unit that controls an armature current in the armature winding, wherein the control apparatus is configured to calculate the magnetic-field current and the armature current required for the target starting apparatus rotation speed, and the control apparatus controls the rotating electric machine according to the calculated magnetic field current and the calculated armature current.

* * * * *